United States Patent
Culler

(10) Patent No.: US 6,788,284 B1
(45) Date of Patent: *Sep. 7, 2004

(54) DEVICES, SYSTEMS AND METHODS FOR POSITION-LOCKING CURSOR ON DISPLAY DEVICE

(75) Inventor: Jason H. Culler, Livermore, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 09/580,702

(22) Filed: May 30, 2000

(51) Int. Cl.[7] .................................................. G09G 5/00
(52) U.S. Cl. ................ 345/156; 345/157; 345/160; 345/161; 345/163; 345/167; 345/168; 200/5 R; 200/5 C; 200/5 D; 200/5 E; 361/680; 361/681; 361/683; 361/686
(58) Field of Search .................... 345/156–163, 345/168, 172, 173, 179, 184, 856–866; 200/5 R, 5 C, 5 D, 5 E; 361/680, 681, 683, 686

(56) References Cited

U.S. PATENT DOCUMENTS

| | | | | |
|---|---|---|---|---|
| 4,816,810 A | * | 3/1989 | Moore .................... 273/148 B |
| 5,198,802 A | * | 3/1993 | Bertram et al. ............. 345/163 |
| 5,327,528 A | * | 7/1994 | Hidaka et al. .............. 345/642 |
| 5,479,192 A | * | 12/1995 | Carroll et al. .............. 345/157 |
| 5,565,887 A | * | 10/1996 | McCambridge et al. .... 345/157 |
| 5,585,823 A | * | 12/1996 | Duchon et al. ............. 345/157 |
| 5,598,183 A | * | 1/1997 | Robertson et al. .......... 345/157 |
| 5,608,895 A | * | 3/1997 | Lee ............................ 345/157 |
| 5,642,131 A | * | 6/1997 | Pekelney et al. ........... 345/862 |
| 5,646,647 A | * | 7/1997 | Chow ......................... 345/764 |
| 5,745,099 A | * | 4/1998 | Blomqvist .................. 345/859 |
| 5,786,805 A | * | 7/1998 | Barry ......................... 345/159 |
| 5,805,161 A | * | 9/1998 | Tiphane ..................... 345/663 |
| 6,014,127 A | * | 1/2000 | Blomqvist .................. 345/856 |
| 6,100,875 A | * | 8/2000 | Goodman et al. .......... 345/159 |
| 6,323,842 B1 | * | 11/2001 | Krukovsky ................. 345/156 |
| 6,339,440 B1 | * | 1/2002 | Becker et al. .............. 345/157 |
| 6,545,666 B1 | * | 4/2003 | Culler ........................ 345/168 |

* cited by examiner

Primary Examiner—Henry N. Tran

(57) ABSTRACT

Devices, systems and methods for position-locking a cursor on a display device are provided. A preferred input device includes a position-locking device configured to electrically communicate with a computer. The position-locking device incorporates a lock-enable switch which, when activated, locks a position of the cursor on the display device of the computer while enabling functional information, provided by the mouse-type input device of the computer, to provide selected functionality of the cursor. Additionally, when disabled, the position-locking device unlocks the position of the cursor so that the cursor is movable about the display area in response to the movement information provided by the mouse-type device.

10 Claims, 4 Drawing Sheets

DEVICES, SYSTEMS AND METHODS FOR POSITION-LOCKING CURSOR ON DISPLAY DEVICE

BACKGROUND OF THE INVENTION

1. Field of the Invention

The present invention relates generally to input devices for computers and, in particular, to devices, systems and methods for position-locking a cursor on a display device of a computer-based system.

2. Description of the Related Art

With the use of large and multi-head display devices becoming ever more prevalent, computer operators, such as graphic and CAD designers, for example, are experiencing difficulties interfacing with computer applications displayed on the display devices when utilizing conventional mouse-type input devices. More specifically, computer operators are finding it difficult to utilize the increased display area provided by the larger and multi-head displays without experiencing a characteristic of cursor movement about the display known as "mouse twitch" or "jump."

As utilized herein, "twitch" or "jump" is defined as the tendency of a mouse-driven cursor to move in a manner not desired by the operator. For instance, twitch may occur when the operator attempts to actuate a function of a mouse input device, such as by depressing an actuator or button of the mouse. Movement of the cursor during an actuation of a mouse function may occur when the cursor is in a location on the display device that is not designated by one of a predetermined number of grid points. For instance, when the cursor is located at a non-grid point and a mouse function is actuated, typically, the cursor will tend to move, i.e., twitch or jump, to the grid point closest to the cursor's current location. Movement of the cursor during an actuation of a mouse function also may occur due to inadvertent movement of the mouse during such actuation. Additionally, when an operator utilizes large or multi-head display devices, such as while performing CAD functions, typically, the operator selects speed/sensitivity settings for the mouse that allow a small movement of the mouse to correspond to a relatively large movement of the associated cursor across the display area. However, many operations, such as CAD operations, oftentimes require the use of precise (small scale) cursor movements which is not easily accommodated by the aforementioned operator-selected speed/sensitivity settings of the mouse.

Heretofore, in an effort to avoid mouse twitch or jump, computer operators typically change mouse speed and/or sensitivity settings for a mouse-type input device when switching between various computer applications and/or displays. Thus, it is not uncommon for a computer operator to switch mouse speed and/or sensitivity settings when switching from applications such as word processing, or other text-based applications, for example, to a graphic-based application, such as CAD, for instance, or even from one CAD function to another. However, since each change of mouse speed and/or sensitivity settings takes time, the efficiency of the computer operator may be reduced in proportion to the number of changes made.

Therefore, there is a need for improved systems and method which address these and other shortcomings of the prior art.

SUMMARY OF THE INVENTION

Briefly described, the present invention relates to devices, systems and methods for position-locking a cursor on a display device. In a preferred embodiment, an input device is provided for interfacing with a computer application. The computer application is adapted to display a cursor within a display area of a display device of a computer, which utilizes a mouse-type input device for providing movement information and functional information corresponding to the cursor so that the cursor is movable about the display area in response to the movement information and is adapted to provide selected functionality in response to the functional information. The input device includes a position-locking device configured to electrically communicate with the computer. The position-locking device incorporates a lock-enable switch which provides a lock position and an unlock position so that, in the lock position the position-locking device locks a position of the cursor on the display device while enabling functional information, provided by the mouse-type input device, to provide selected functionality of the cursor. Additionally, in the unlock position the position-locking device unlocks the position of the cursor so that the cursor is movable about the display area in response to the movement information provided by the mouse-type device.

In another embodiment, an input device for interfacing with a computer application is provided. The input device includes means for locking a position of the cursor on the display device, with the means providing a lock-enable mode and a lock-disable mode. The lock-enable mode locks a position of the cursor on the display device and enables functional information, provided by the mouse-type input device, to provide selected functionality of the cursor while the position of the cursor is locked, and the lock-disable mode locks the position of the cursor so that the cursor is movable about the display area in response to the movement information.

In another embodiment, a computer system for operating a computer application is provided. The computer system includes a display device with a display area configured to display graphical information thereon and a mouse-type input device configured to provide a user-interface with the computer application. The computer application is adapted to display a cursor within the display area of the display device, with the mouse-type input device being configured to provide movement information and functional information corresponding to the cursor so that the cursor is movable about the display area in response to the movement information and being configured to provide selected functionality to the cursor in response to the functional information. Additionally, a position-locking input device is provided which is configured to provide a user-interface with the computer application.

Embodiments of the present invention also may be construed as providing a method for interfacing with a computer application. In a preferred embodiment, a method for interfacing with such a computer application includes the steps of: locking a position of the cursor on the display device; enabling functional information, provided by the mouse-type input device, to provide selected functionality of the cursor while the position of the cursor is locked, and; unlocking the position of the cursor so that the cursor is movable about the display area in response to the movement information.

In another embodiment, a computer readable medium incorporating a computer program for interfacing with a computer application is provided. Preferably, the computer readable medium includes: logic configured to lock a position of the cursor on the display device; logic configured to enable functional information, provided by the mouse-type input device, to provide selected functionality of the cursor while the position of the cursor is locked, and; logic configured to unlock the position of the cursor so that the cursor is movable about the display area in response to the movement information.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
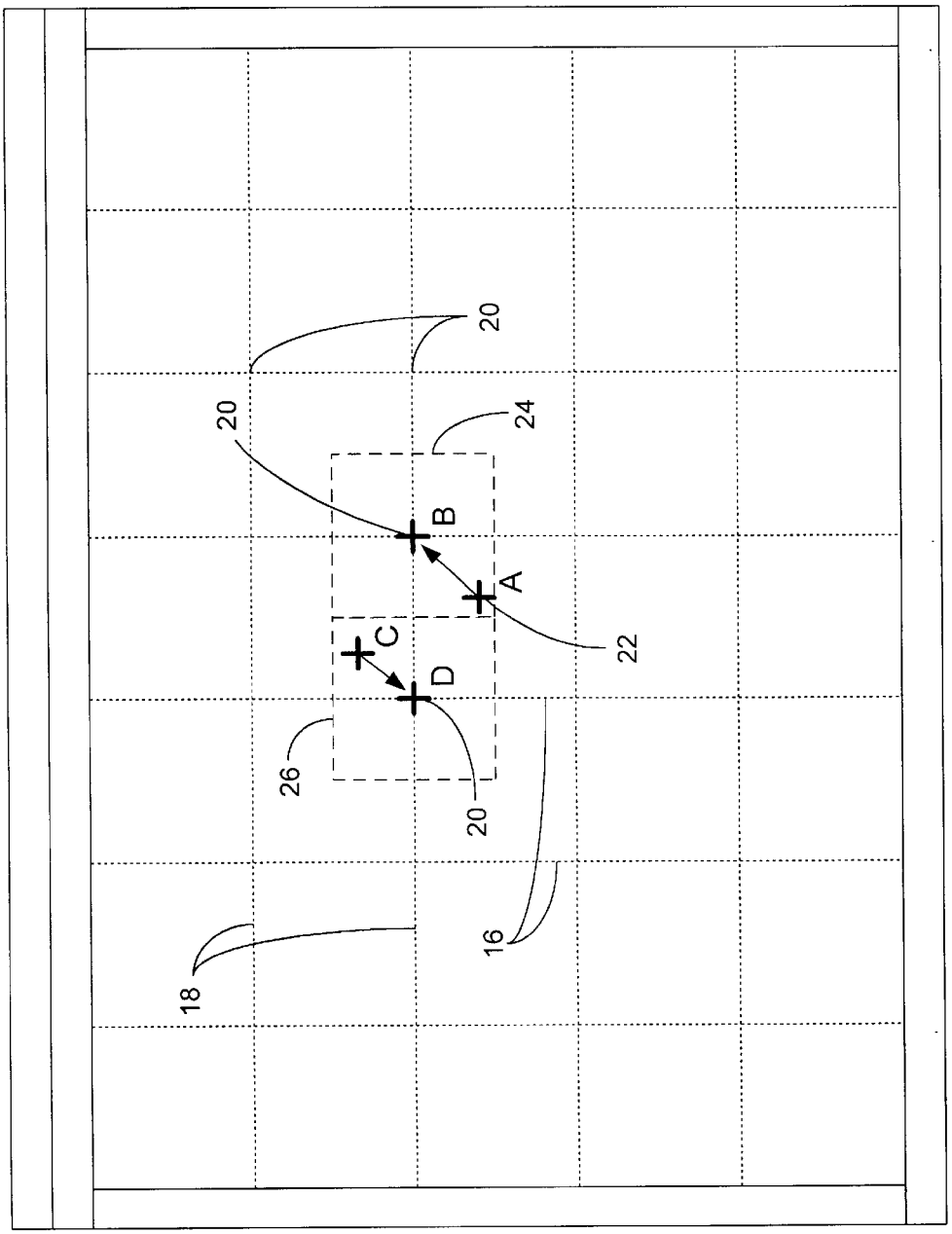
FIG. 1 is a diagram depicting mouse twitch or jump.

Reference will now be made in detail to the description of the invention as illustrated in the drawings with like numerals indicating like parts throughout the several views. As is known, a display device, i.e., a computer monitor, for example, is configured for displaying graphical information provided from a processor-based system.

For instance, a display device may be configured for presenting a computer application, such as a CAD application, to an operator. A representative depiction of a CAD application, as typically displayed on a display device, is shown in FIG. 1. It should be noted that the preferred embodiments of the present invention described herein will be discussed, primarily, in relation to a CAD application, such as the application depicted in FIG. 1, for ease of description and not for purposes of limitation. Thus, the present invention may be utilized with numerous other applications incorporating the use of a mouse-driven cursor, as described in detail hereinafter, with such other applications being considered well within the scope of the present invention.

As depicted in FIG. 1, CAD application 12 provides a computer operator with a grid network 14 formed of a series of horizontal rows 16 and a series of vertical columns 18, with the grid network, oftentimes, being displayed to the operator. A plurality of predetermined points 20 are established at the intersections of the rows and columns, thereby providing the operator with grid-established points at which a cursor, such as cursor 22, may be located when performing various functions provided by the application.

The computer operator typically interfaces with the application by manipulating a mouse-type input device (not shown) that provides x and y coordinate data, corresponding to the movements of the mouse-type input device, as well as function-actuation data, corresponding to actuation of a "left-click" or "right-click" button, for example, to the processor-based system. The processor-based system then evaluates the various data and displays an appropriately positioned cursor 22 on the display. Thus, by moving the mouse-type input device and/or by actuating various actuators of the device, the computer operator may enable various application functionality at various locations about the display.

As mentioned briefly hereinbefore, a cursor may present the operator with mouse twitch or jump. For instance, when the cursor 22 is displayed in position A (FIG. 1), which is defined by a point 20 of the grid network, and an actuator of the mouse-type input device is depressed or the mouse-type input device is inadvertently moved, the cursor may move without additional operator input to position B, which also is defined by a point 20 of the grid network. Thus, a zone 24 surrounds position B, whereby actuation of a mouse function while the cursor is displayed within the zone 24 results in the cursor moving to the center of that zone, e.g., the point 20 of the grid network. Likewise, a zone 26 surrounds position D, whereby actuation of a mouse function while the cursor is displayed within the zone 26, such as when the cursor is being displayed at position C, results in the cursor moving to the center of zone 26.

If the computer operator desires to have the particular mouse functionality enabled at the location A, the operator typically must reset the mouse speed and/or sensitivity settings to an appropriate setting so that the position A may be appropriately and/or more conveniently recognized. As described in detail hereinafter, the present invention provides systems and methods for position locking a cursor on a display device so that, for instance, the operator need not reset the mouse speed and/or sensitivity settings to achieve the desired functionality at a point, such as by establishing the desired point as a point of the grid network or by utilizing a more appropriate speed and/or sensitivity setting so that the desired point may be more conveniently captured.

The position-locking system of the present invention can be implemented in hardware, software, firmware, or a combination thereof. In a preferred embodiment, however, the invention is implemented as a software package, which can be adaptable to run on different platforms and operating systems as shall be described further herein. In particular, a preferred embodiment of the position locking system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electro-magnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
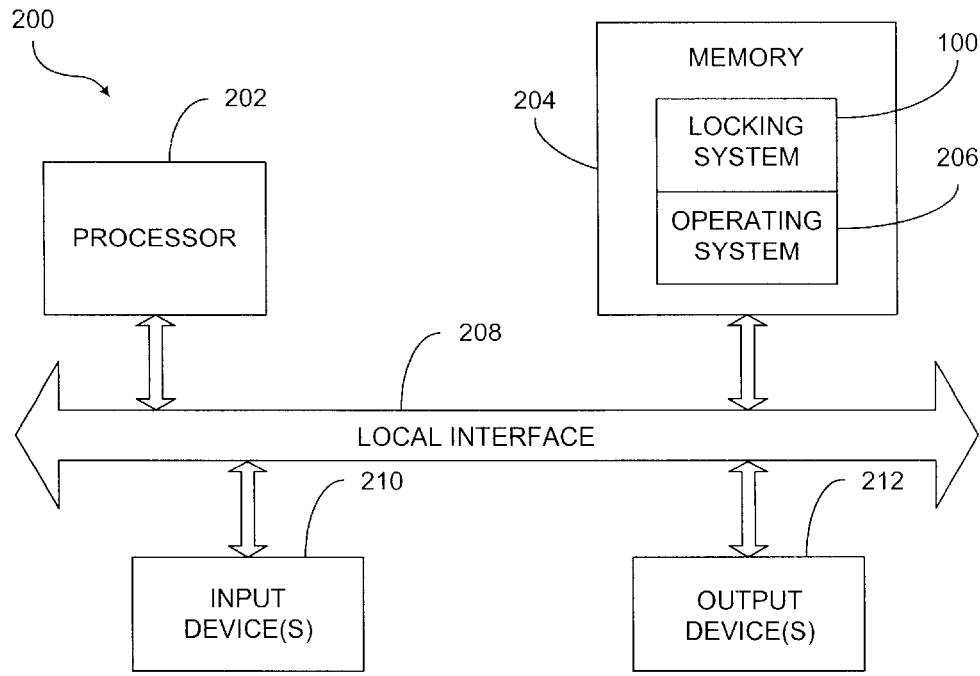
FIG. 2 is a schematic diagram depicting a processor-based system which may be utilized in implementing a preferred embodiment of the preferred invention.

FIG. 2 illustrates a typical computer or processor-based system 200 which may utilize the position locking system 100 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The position locking system 100 of the present invention, the functions of which shall be described hereinafter, resides in memory 204 and is executed by the processor 202.

Figure 3:
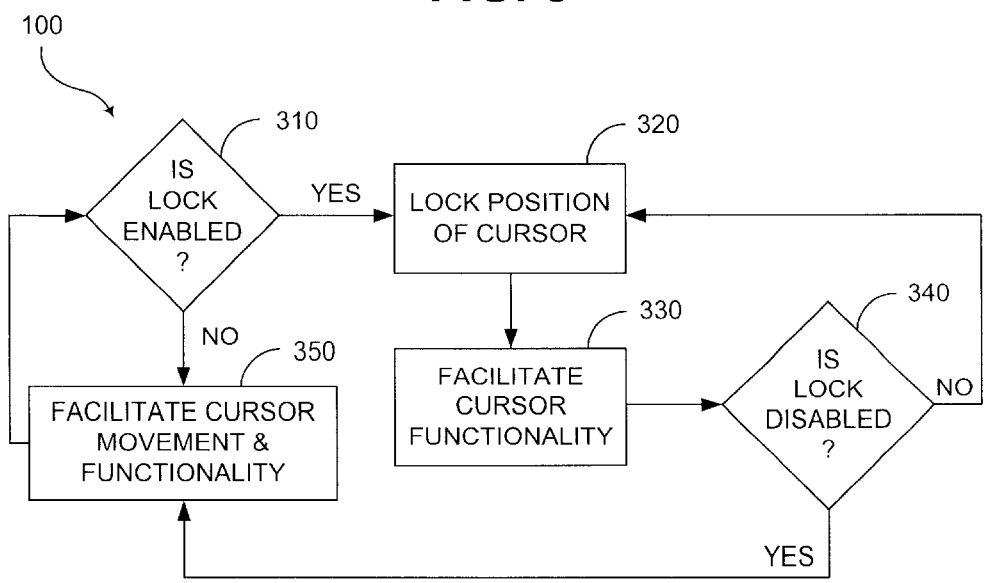
FIG. 3 is a high-level block diagram depicting a preferred method of the present invention.

The flow chart of FIG. 3 shows the functionality and operation of a preferred implementation of the position-locking system 100 depicted in FIG. 2. In this regard, each block of the flow chart represents a module segment or portion of code which comprises one or more executable instructions for implementing the specified logical function or functions. It should also be noted that in some alternative implementations the functions noted in the various blocks may occur out of the order depicted in FIG. 3. For example, two blocks shown in succession in FIG. 3 may in fact be executed substantially concurrently where the blocks may sometimes be executed in the reverse order depending upon the functionality involved.

In the embodiment of the position locking system 100 depicted in FIG. 3, the process preferably begins at block 310 where a determination is made as to whether the position lock has been enabled. If it is determined that the lock has been enabled, the process may proceed to block 320 where the position of the cursor, as currently being displayed upon the display screen, is locked. Thereafter, the process may proceed to block 330 where cursor functionality, such as the ability of the operator to initiate application functions by actuating one or more of the various actuators of the mouse-type input device, is facilitated. Subsequently, a determination may be made, such as in block 340, as to whether the position lock has been disabled. If it is determined that the lock has not been disabled, the system may proceed back to block 320 where the cursor is retained in its locked position. If, however, it is determined that the lock has been disabled, the process may proceed to block 350. Preferably, the process also proceeds to block 350 when it is determined, such as in block 310, that the position lock has not been enabled. At block 350, cursor movement data, i.e., x-y coordinate data provided by mouse-type input device, is evaluated and the cursor is appropriately displayed. As depicted in block 350, cursor functionality also is facilitated. After block 350, the process preferably returns to block 310 where the system may proceed as described hereinbefore.

Figure 4A:
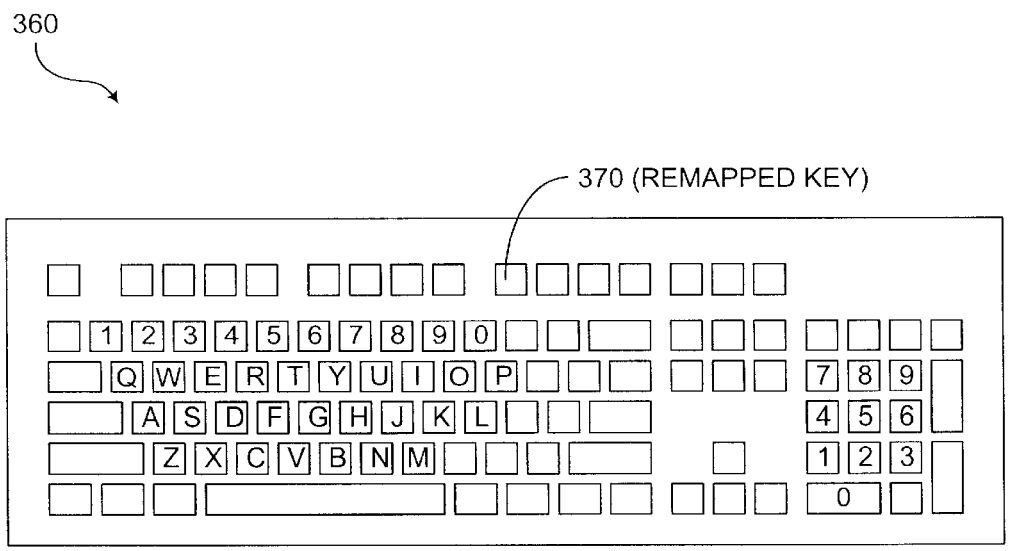
FIG. 4A is a schematic diagram of a keyboard that can be used to implement an alternative embodiment of the present invention.

As mentioned hereinbefore, the present invention may be implemented in hardware, software, firmware or combinations thereof. In regard to embodiments of the present invention incorporating, at least in part, software, position lock-enable functionality of the present invention may be implemented on one or more keys of a conventional keyboard (see keyboard 360 of FIG. 4A). In particular, preferred embodiments may utilize a user-specified key, e.g., key 370, which has been re-mapped as a lock-enable switch by use of the aforementioned software. Thus, after the keyboard 360 has been re-mapped, actuation of the lock-enable key 370 locks the position of the cursor depicted upon the display device until the lock-enable switch is once again actuated, thereby disabling the position lock function. So configured, a computer operator need not switch mouse speed and/or sensitivity settings when moving among various display screens and/or applications which may, otherwise, utilize different default mouse speed settings and/or sensitivities.

Figure 4B:
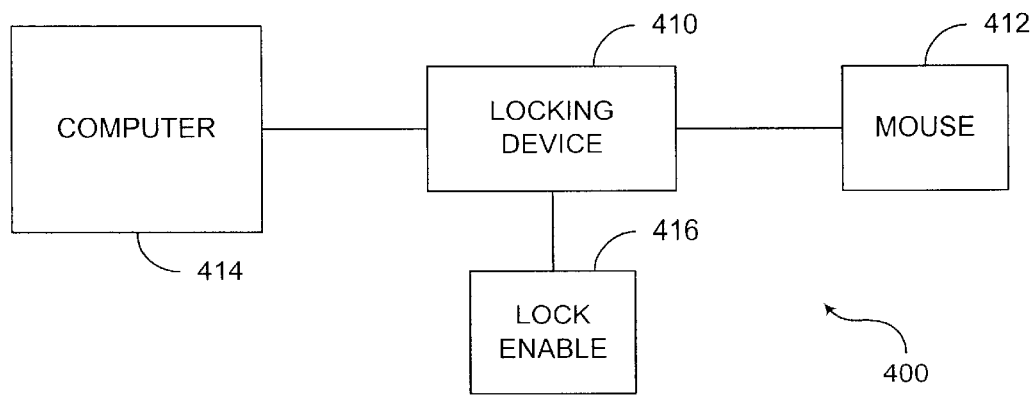
FIG. 4B is a schematic diagram depicting an alternative embodiment of the present invention.

As depicted in FIG. 4B, a preferred embodiment 400 of the present invention incorporates the use of a position-locking device or lock box 410. Lock box 410 is electrically interconnected intermediate of a mouse-type input device 412 and its associated computer system 414, and preferably incorporates the use of a lock-enable switch 416. Lock-enable switch 416 may be provided in various locations such as on the lock box or, as shown in FIG. 4B, on an independently movable platform which is electrically interconnected with the lock box. Regardless of the particular configured utilized, activation of the lock-enable switch facilitates interception, by the lock box, of movement information provided by the mouse-type input device, thereby position-locking the cursor on the display device. Functional information provided by the mouse-type input device, however, is routed to the computer to facilitate various functionality provided by the mouse-type input device.

Figure 5:
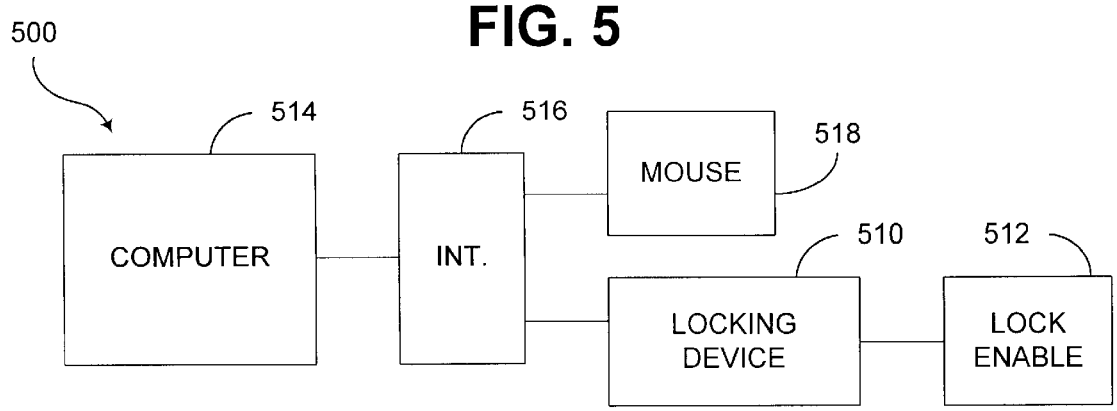
FIG. 5 is a schematic diagram depicting an alternative embodiment of the present invention.

Referring now to FIG. 5, an alternative embodiment 500 incorporates the use of a lock box 510 and lock-enable switch 512. In contrast to the embodiment depicted in FIG. 4, however, system 500 incorporates the use of such a lock box in a non-in-line arrangement. In particular, the lock box is configured to provide lock-enable data to the computer 514 via an interface device or switch box 516 which also is configured to receive input from the mouse-type input device 518. So configured, the switch box facilitates interception of movement information provided by the mouse-type input device when the lock enable switch of the lock box is actuated, thereby position-locking the cursor on the display device. Functional information provided by the mouse-type input device, however, is routed through the switch box and to the computer to facilitate various functionality provided by the mouse-type input device.

Figure 6:
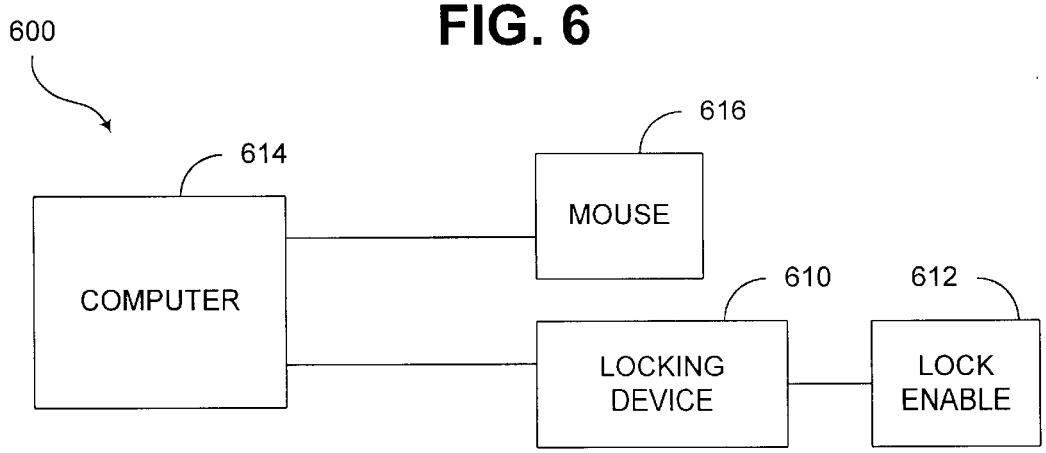
FIG. 6 is a schematic diagram depicting an alternative embodiment of the present invention.

Referring now to FIG. 6, an alternative embodiment 600 incorporates the use of a lock box 610 and lock-enable switch 612 that are configured to provide lock-enable data directly to a computer 614. Preferably, the computer also is adapted to receive input from the mouse-type input device 516. So configured, the movement information provided by the mouse-type input device, when the lock enable switch of the lock box is actuated, is inhibited from influencing movement of the cursor, thereby position-locking the cursor on the display device. Functional information provided by the mouse-type input device, however, is not inhibited, thereby facilitating various functionality provided by the mouse-type input device. Such a configuration may be implemented by use of the software application, such as the application described in relation to FIG. 3, for instance.

Figure 7:
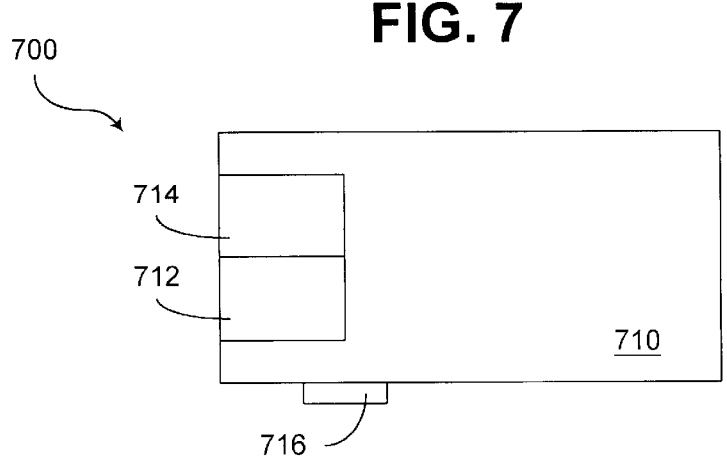
FIG. 7 is a schematic diagram depicting a preferred embodiment of a mouse input device of the present invention.

A preferred embodiment of an input device of the present invention is depicted in FIG. 7. As shown therein, input device 700 includes a body 710, primary actuators 712 and 714, and a secondary actuator 716. Preferably, actuators 712 and 714 are configured for providing conventional mouse functionality, such as "left-click" and "right-click" functions, respectively, and secondary actuator 716 provides lock-enable functionality, as described in detail-hereinbefore. The actuators may be provided in numerous configurations and arrangements in order to fulfill their respective intended functions. It also should be noted that input device 700 is capable of providing cursor movement data to a computer in one of various conventional manners.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said method comprising:

locking a position of the cursor on the display device such that the cursor cannot be moved;

enabling functional information, provided by the mouse-type input device, to provide selected functionality of the cursor while the position of the cursor is locked; and unlocking the position of the cursor such that the cursor is movable about the display area in response to the movement information.

2. The method of claim 1, wherein the step of locking a position of the cursor comprises the steps of:

determining whether a position lock function of the computer is enabled; and if the position lock function is enabled, locking a position of the cursor on the display screen.

3. The method of claim 2, wherein the computer has a keyboard input device, and wherein the step of locking a position of the cursor comprises the steps of:

re-mapping a key of the keyboard such that actuation of the key enables the position lock function.

4. The method of claim 1, wherein the step of locking a position of the cursor comprises the steps of:

intercepting movement information provided by the mouse-type input device; and preventing the movement information from influencing a repositioning of the cursor.

5. The method of claim 4, wherein the step of unlocking the position of the cursor comprises the step of:

allowing the movement information to influence a repositioning of the cursor.

6. The method of claim 1, wherein the step of unlocking the position of the cursor comprises the steps of:

determining whether a position lock function of the computer is disabled; and if the position lock function is disabled, unlocking a position of the cursor.

7. A computer readable medium having a computer program for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said computer readable medium comprising:

logic configured to lock a position of the cursor on the display device such that the cursor cannot be moved;

logic configured to enable functional information, provided by the mouse-type input device, to provide selected functionality of the cursor while the position of the cursor is locked; and logic configured to unlock the position of the cursor such that the cursor is movable about the display area in response to the movement information.

8. An input device for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said input device comprising:

means for locking a position of the cursor on the display device, said means having a lock-enable mode for locking a position of the cursor on the display device such that the cursor cannot be moved, and enabling functional information, provided by the mouse-type input device, to provide selected functionality of the cursor while the position of the cursor is locked, and a lock-disable mode for unlocking the position of the cursor such that the cursor is movable about the display area in response to the movement information.

9. An input device for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said input device comprising:

a position-locking device configured to electrically communicate with the computer, said position-locking device having a lock-enable switch, said lock-enable switch configured to be alternately activated and disabled such that, when actuated said position-locking device locking a position of the cursor on the display device such that the cursor cannot be moved while enabling functional information, provided by the mouse-type input device, to provide selected functionality of the cursor, and when disabled said position-locking device unlocking the position of the cursor such that the cursor is movable about the display area in response to the movement information provided by the mouse-type device.

10. A computer system for operating a computer application, said computer system comprising:

a display device having a display area configured to display graphical information thereon;

a mouse-type input device configured to provide a user-interface with the computer application, the computer application being adapted to display a cursor within said display area of said display device, said mouse-type input device being configured to provide movement information and functional information corresponding to the cursor such that the cursor is movable about said display area in response to said movement information and being configured to provide selected functionality to the cursor in response to said functional information, a position-locking input device configured to provide a user-interface with the computer application, said position-locking input device having a lock-enable switch, said lock-enable switch configured to be alternately activated and disabled such that, when activated said position-locking device locking a position of the cursor on said display device such that the cursor cannot be moved while enabling functional information, provided by said mouse-type input device, to provide selected functionality of the cursor, and when disabled said position-locking device unlocking the position of the cursor such that the cursor is movable about said display area in response to said movement information provided by said mouse-type device.

* * * * *